United States Patent
Lueders et al.

(10) Patent No.: US 10,024,456 B2
(45) Date of Patent: Jul. 17, 2018

(54) ADJUSTMENT SYSTEM FOR A ROTARY VALVE

(71) Applicant: VOLKSWAGEN AKTIENGESELLSCHAFT, Wolfsburg (DE)

(72) Inventors: Ralf Lueders, Peine (DE); Holger Fries, Goslar (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/112,201

(22) PCT Filed: Oct. 20, 2014

(86) PCT No.: PCT/EP2014/072424
§ 371 (c)(1),
(2) Date: Jul. 18, 2016

(87) PCT Pub. No.: WO2015/106845
PCT Pub. Date: Jul. 23, 2015

(65) Prior Publication Data
US 2016/0341331 A1    Nov. 24, 2016

(30) Foreign Application Priority Data

Jan. 17, 2014 (DE) .......................... 10 2014 200 844

(51) Int. Cl.
| | |
|---|---|
| *F16K 31/53* | (2006.01) |
| *F01P 7/14* | (2006.01) |
| *F16K 11/16* | (2006.01) |
| *F16H 19/00* | (2006.01) |

(52) U.S. Cl.
CPC .............. *F16K 31/535* (2013.01); *F01P 7/14* (2013.01); *F16H 19/001* (2013.01); *F16K 11/165* (2013.01); *F01P 2007/146* (2013.01); *F16H 2019/008* (2013.01)

(58) Field of Classification Search
USPC ........................................................ 137/637
See application file for complete search history.

(56) References Cited

U.S. PATENT DOCUMENTS 8,973,457 B2 * 3/2015 Yamaoka .............. F16H 19/001
74/421 A
2012/0048217 A1   3/2012 Triebe et al.

FOREIGN PATENT DOCUMENTS

| DE | 102006059029 A1 | 6/2008 |
|---|---|---|
| DE | 102007019064 B3 | 8/2008 |
| DE | 102009010947 B3 | 6/2010 |

(Continued)

*Primary Examiner* — John Fox
(74) *Attorney, Agent, or Firm* — Laurence A. Greenberg; Werner H. Stemer; Ralph E. Locher

(57) ABSTRACT

An adjustment system for a rotary valve having a drive wheel with drive wheel teeth that can turn about a first axis of rotation to drive a driven wheel with driven wheel teeth that can turn about a second axis of rotation that is substantially parallel to the first axis of rotation. The teeth extend in each case around only part of the circumference of the respective wheel. The driven wheel can be adjusted by the turning of the drive wheel from a first rotational position, in which the teeth are mutually engaged, into a locking position, in which the driven wheel is held in place when the drive wheel turns further. A rotary valve with such an adjustment system is also described.

17 Claims, 5 Drawing Sheets

(56) References Cited

FOREIGN PATENT DOCUMENTS

DE 102009020187 A1 11/2010
DE 102011078907 A1 1/2012

* cited by examiner

ADJUSTMENT SYSTEM FOR A ROTARY VALVE

BACKGROUND OF THE INVENTION

Field of the Invention

The present invention relates to an adjustment system for a rotary valve, having a drive wheel provided with drive wheel toothing and rotatable about a first axis of rotation in order to drive a driven wheel provided with a driven wheel toothing and rotatable about a second axis of rotation. The two axes of rotation run substantially parallel to one another. Here the drive wheel toothing and the driven wheel toothing in each case extend only over a defined angular span in a circumferential direction.

Rotary valves can be used to adjust a volumetric flow of fluid through a flow passage. For this purpose, they comprise cross sectional adjustment elements, which according to their rotational position either open or close the flow passage, allowing a fluid to flow in/out. For this purpose, the cross sectional adjustment elements may themselves have an aperture, which in an open position coincides with the flow passage and thereby opens the flow passage, and in a closed position is rotated relative to the flow passage, thereby closing the flow passage. Such rotary valves are used, in particular, in coolant circuits of internal combustion engines, where they open and close multiple branches either independently of one another or interdependently. Where necessary, the rotary valves may be driven via a mechanism of a drive unit such as a control motor.

Map-controlled coolant regulators often require two or more rotary valves performing a different sequence of motions, which are driven by just one drive unit. In this case the first rotary valve may comprise the drive wheel and the second rotary valve the driven wheel, so that a rotation of the first rotary valve causes a rotation of the second rotary valve. The drive wheel and the driven wheel can be connected to one another by a gear mechanism. The "adjustment system" referred to at the outset comprises the drive wheel (driving gear) and the driven wheel (driven gear), driven by the former by way of a gear mechanism, a rotary valve being connected or connectable to the drive wheel and/or to the driven wheel.

FIG. 5 represents a conventional adjustment system having a driving gear 50 and a driven gear 51 which can be driven by the former, the gears each being parts of a rotary valve. The driving gear 50 and the driven gear 51 have a toothing system 55, 56, which extends in a circumferential direction over a defined angular span of the respective wheel. The transmission gearwheel 52 is arranged between the driving gear 50 and the driven gear 51 and meshes in the two toothing portions 55, 56. From a first rotational position represented in FIG. 5a the driving gear 50 can be rotated in the direction of the arrow in order to drive the driven gear 51 in the direction of the arrow with the transmission gearwheel 52 as intermediate step. When the arresting position represented in FIG. 5b is reached, a further rotation of the driving gear 50 in the direction of the arrow does not produce any further adjustment of the driven gear 51 in the direction of the arrow. Rather, the rotational locking which acts between the driving gear 50 and the transmission gearwheel 52 causes the driven gear 51 to remain in the arresting position represented in FIG. 5b. A first rotary valve connected to the driving gear 50 can thus be adjusted independently of a second rotary valve connected to the driven gear 51.

An adjustment system with a similar operating principle is described in the publication DE 10 2009 020 187 A1.

The publication DE 10 2009 010 947 B3 describes an adjustment system in which the axis of rotation of the drive wheel runs at an angle to the axis of rotation of the driven wheel. This adjustment system is suitable for special spatial geometries, since here the rotary valves can be arranged very compactly in relation to one another so as to save space, although on the other hand it requires a lot of maintenance and is prone to malfunction. Furthermore, this adjustment system is not suitable for regular geometries with axes of rotation running parallel to one another.

The publication DE 10 2007 019 064 B3 shows an adjustment system in which the axis of rotation of the driving gear coincides with the axis of rotation of the driven gear. A transmission gearwheel meshes radially from the outside in mutually opposed driver elements of the driving gear and the driven gear in order to drive the driven gear.

However, the cost of assembly and maintenance is considerable in the case of the adjustment systems described. Furthermore, the adjustment systems described in the publications DE 10 2007 019 064 B3 and DE 10 2009 020 187 A1 require a large amount of overall space.

BRIEF SUMMARY OF THE INVENTION

In view of the problems described, the object of the present invention is to provide an adjustment system for rotary valves that is easy to assemble and maintain, which at the same time allows an especially compact arrangement of the rotary valves.

According to the invention this object is achieved by a development of the adjustment system described at the outset, which is substantially characterized in that by a rotation of the drive wheel the driven wheel can be adjusted from a first rotational position, in which the drive wheel toothing and the driven wheel toothing intermesh, into an arresting position, in which the driven wheel is held stationary in the event of a further rotation of the drive wheel. Advantageous embodiments of the invention are described in the further claims.

In other words, in the first rotational position the drive wheel toothing meshes directly in the driven wheel toothing, so that according to the invention there is no need for the interposition of a transmission gearwheel for transmitting the force. A rotation of the drive wheel from the first rotational position in an adjusting direction (either clockwise or counter-clockwise) therefore directly brings about a rotation of the driven wheel, until the end of the toothing portions is reached in a circumferential direction ("transitional position"). A further rotation of the drive wheel brings the driven wheel into the arresting position, in which the driven wheel remains substantially stationary, even in the event of further rotation of the drive wheel, since at this point in time the toothing portions no longer intermesh with one another. Only when the drive wheel is turned backwards from the arresting position counter to the adjusting direction and the toothing portions again intermesh with one another is the driven wheel returned to the first rotational position.

If the driven wheel is situated in the arresting position, the drive wheel is able to rotate clockwise and counter-clockwise through a specific angular range without this resulting in an adjustment of the driven wheel. The arresting position of the driven wheel therefore corresponds to an adjustment range of the drive wheel.

The invention stems from the finding that because of the transmission gearwheel the conventional adjustment systems represent a two-step transmission mechanism. Two-step transmission mechanisms are of complex assembly and require more maintenance than the "single-step transmission mechanism" according to the invention, in which the drive wheel meshes directly in the driven wheel for adjustment of the latter. The single-step design eliminates the transmission gearwheel and its axis of rotation, together with the bearings of the axis in a housing. Besides the cost of assembly this also reduces the outlay for parts. Moreover, due to the absence of the transmission gearwheel the overall size of the transmission mechanism is reduced compared to the conventional solutions. In other words, the sequential engagement described (first rotation, then arresting of the driven wheel) is achieved by just one gear step with no additional components.

According to the invention the terms drive wheel and driven wheel do not necessarily imply a regular gearwheel or the like. Rather, the drive wheel may be part of a rotary valve or a body rotatable about an axis for connection to a rotary valve, which over a constituent portion in a circumferential direction has a toothing (drive wheel toothing) for meshing with mating teeth (driven wheel toothing). FIG. 5 represents an example of a rotary valve arrangement, in which the drive wheel and the driven wheel are parts of rotary valves. The toothing does not necessarily take the form of a regular gearwheel toothing.

Rather, the toothing may take the form of radially or axially protruding projections of any shape, which are designed to mesh in complementary depressions of the mating teeth, so that they carry the projections of the mating teeth with them as they rotate.

In order to reduce wear, heating and noise generated as the wheels mesh, however, any slipping of the surfaces of the teeth on one another should preferably be prevented. In the same way, a consistently uniform transmission of the motion should be ensured, so that no damage to the wheels occurs. These conditions are optimally fulfilled by an involute toothing as represented in FIG. 1, for example, because with this tooth shape the surfaces roll on one another.

Here the individual teeth of the toothing systems preferably project in a radial direction from a circumferential surface in the manner of a spur gear mechanism (single-step spur gear mechanism).

According to the invention the axis of rotation of the drive wheel runs substantially parallel to the axis of rotation of the driven wheel, an angle one to the other of approximately 10° still being deemed to be substantially parallel.

The number of teeth of the drive wheel toothing preferably corresponds substantially to the number of teeth of the driven wheel toothing. Here the number of teeth may be three, four, five or more on each wheel, as necessary.

Here it has proved advisable for the drive wheel toothing and/or the driven wheel toothing to extend over a circumferential angular span of between 10° and 180°, preferably between 30° and 90°, more preferably between 50° and 70°, especially about 60°. Such a maximum rotational angle of the driven wheel has proved advantageous, at the same time still allowing sufficient space for the adjustment range in a circumferential direction.

In order to prevent the driven wheel shifting from the arresting position under a further rotation of the drive wheel, the driven wheel may comprise an arresting projection, which adjoins the driven wheel toothing in a circumferential direction and which preferably takes the form of an arresting flange projecting radially outwards. In the arresting position the arresting flange comes to bear against a circumferential face of the drive wheel, so that a further rotation of the driven wheel is blocked.

The arresting projection preferably comprises a concavely curved outer face, the radius of curvature of which preferably corresponds substantially to a radius of curvature of a convex circumferential face of the drive wheel. The drive wheel can therefore be turned further in the adjustment direction when the driven wheel is situated in the arresting position, whilst its convex circumferential face slides along the concave face of the arresting flange.

With a view to holding the driven wheel reliably in the arresting position, the drive wheel may comprise an annular step, adjoining the drive wheel toothing in a circumferential direction and having a convex, preferably substantially circularly curved circumferential face, the diameter of which is preferably greater than the root diameter of the drive wheel toothing. The arresting projection may bear against the annular step in the arresting position. The annular step may extend over a remaining area of the drive wheel in the circumferential direction in which there is no drive wheel toothing. The drive wheel is then situated in the adjustment range when the annular step is facing the driven wheel.

An annular step is taken to mean an axially or radially protruding projection, running annularly around at least a portion of the axis of rotation and having a preferably convexly curved circumferential face facing the driven wheel in the arresting position.

Here the outside diameter of the annular step may correspond substantially to the tip diameter of the drive wheel toothing. This leads to a gentle transition of the driven wheel from the transitional position into the arresting position and inversely from the transitional position back into the toothing engagement, since the last tooth of the drive wheel toothing is able to merge continuously and steplessly into the annular step, so that no tilting or the like can occur with the opposing driven wheel toothing.

With a view to an advantageous ratio between the dimensions of the toothing portion and the dimensions of the adjustment range in the circumferential direction, it has proved advisable for the annular step to extend over a circumferential angle of between 60° and 270°, preferably between 120° and 220°. Alternatively, the annular step may extend over the entire remainder of the circumference in a circumferential direction in which no drive wheel toothing is arranged, in which case the remaining circumference may amount to 300°.

Here in the arresting position the circumferential face of the annular step may be adapted to bear on one of the teeth of the driven wheel toothing, thereby preventing the driven wheel from turning back towards the first rotational position. When the driven wheel is in the arresting position, under a rotation of the drive wheel the circumferential face of the annular step slides along the tooth flank of this tooth, preferably the penultimate or last tooth of the driven wheel toothing. The tooth flank of the penultimate (or last) tooth on the one hand, and a concave face of the arresting projection, which adjoins the last tooth, on the other may together form a substantially concave trough, in which the annular step of the drive wheel meshes in the arresting position. This trough forms a safeguard to prevent a rotation of the driven wheel out of the arresting position when the annular step engages therein.

Alternatively, or in addition, at least one of the teeth of the driven wheel toothing, preferably the last tooth in a circumferential direction, is formed narrower in an axial direction than the penultimate tooth in a circumferential direction, in order to provide a void in which to receive the annular step behind this tooth in the arresting position. This means that the trough described above is not interrupted by the concavely projecting last tooth.

In an especially preferred embodiment of the invention, in the arresting position the circumferential face of the annular step bears firstly against the arresting projection of the driven wheel, thereby preventing a further rotation of the driven wheel, and secondly against the tooth flank of the penultimate tooth of the driven wheel toothing, thereby preventing the driven wheel from turning back, the last tooth preferably being formed narrower than the penultimate tooth.

When the drive wheel rotates out of the adjustment range in a return direction (counter to the adjustment direction) and again reaches the transitional position, in which the annular step ends and the drive wheel toothing begins, the engagement between the drive wheel toothing and the driven wheel toothing is re-established by means of the last tooth of the driven wheel toothing and the driven wheel can be turned back into the first rotational position.

In an alternative embodiment of the invention the drive wheel comprises a second annular step having a circularly curved circumferential face, designed to bear against the arresting projection adjoining the driven wheel toothing in a circumferential direction. In addition, the tooth flank of the preferably last or penultimate tooth of the driven wheel toothing may be adapted to bear against the circumferential face of the (first) annular step.

In this case it has proved advisable for the diameter of the second annular step to be smaller than the diameter of the first annular step, the arresting projection preferably protruding radially further from the driven wheel than the driven wheel toothing. The circumferential face of the second annular step may adjoin the circumferential face of the first annular step with an axial and radial offset. The diameter of the inner annular step preferably corresponds substantially to the root diameter of the drive wheel toothing and the diameter of the outer annular step corresponds substantially to the tip diameter of the drive wheel toothing. This simplifies the manufacture of the drive wheel.

In an alternative embodiment of the invention the order of the toothing area and the adjustment area in a circumferential direction may be reversed and/or the adjustment direction for adjustment of the driven wheel from the first rotational position to the arresting position may be reversed.

The drive wheel can preferably be driven by a control motor with reversible direction of rotation, the reversing of the direction of rotation of the drive wheel serving to adjust the driven wheel from the arresting position via the transitional position back into the first rotational position. If necessary, the diameters of the drive wheel and the driven wheel may be of different sizes.

According to a further aspect the invention relates to a rotary valve arrangement, in particular one for a coolant circuit of an internal combustion engine comprising multiple branches, having an adjustment system according to the invention, in which the drive wheel is connected to a first cross sectional adjustment element of a rotary valve and/or the driven wheel is connected to a second cross sectional adjustment element of a rotary valve.

BRIEF DESCRIPTION OF THE SEVERAL VIEWS OF THE DRAWING

The invention is explained in more detail below with reference to the drawing, in which.

DESCRIPTION OF THE INVENTION

Figure 1A:
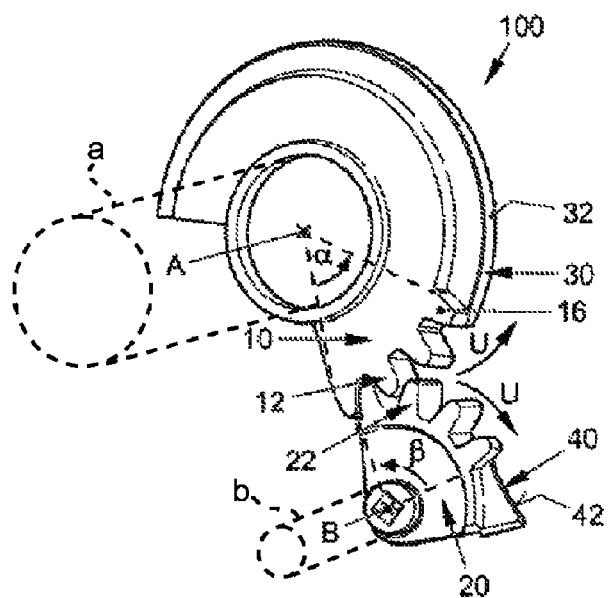
FIG. 1 shows a first embodiment of an adjustment system according to the invention with the driven wheel in the first rotational position (FIG. 1a), in a transitional position (FIG. 1b) and the arresting position (FIG. 1c)

FIG. 1 represents a first embodiment of an adjustment system 100 according to the invention, having a drive wheel 10 and a driven wheel 20 driven by the drive wheel 10. The drive wheel 10 is supported so that it can rotate about a first axis of rotation A, and the driven wheel 20 is supported so that it can rotate about a second axis of rotation B, which runs parallel to the first axis of rotation A. The drive wheel 10 has a drive wheel toothing 12 designed as involute toothing, which extends over a circumferential angular span ($\alpha$) of approximately 60°, and the driven wheel 20 has a driven wheel toothing 22 likewise designed as involute toothing, which extends over a circumferential angular span of approximately 60° ($\beta$). The drive wheel 10 may be connected to a drive unit such as a control motor, which is capable of rotating the drive wheel by a predefined angle clockwise and counter-clockwise.

A first rotary valve a is preferably connected to or integrally formed with the drive wheel 10, and a second rotary valve b is preferably connected to or integrally formed with the driven wheel 20.

Other types of toothing and other circumferential angular spans are equally possible.

In the first rotational position (starting position) of the driven wheel 10 shown in FIG. 1a the drive wheel toothing 12 meshes directly and without the interposition of a second transmission step in the driven wheel toothing 22. Under a clockwise rotation of the drive wheel 10, the driven wheel is carried by the tooth engagement so that is rotates counter-clockwise into the transitional position represented in FIG. 1b.

Along its circumference as a continuation of the toothed area the drive wheel 10 has an annular step 30 with an annularly curved circumferential face 32, which extends over a circumferential angular span of more than 180°. When the annular step 30 is situated opposite the driven wheel 20, the drive wheel 10 is situated in an adjustment range in which the rotary valve connected to the drive wheel 10 can be adjusted or regulated whilst the second rotary valve is kept stationary.

The last tooth 16 of the drive wheel toothing 12 merges without a gap in a circumferential direction U into the annular step 30, the tip diameter of the drive wheel toothing 12 corresponding to the outer diameter of the annular step 30, so that in a radial direction no step exists between the annular step 30 and the tooth tip. The axial width of the annular step 30 is smaller than the width of the teeth, so that by bearing on one of the teeth of the driven wheel toothing 22 the annular step 30 prevents the driven wheel 20 from turning back and thus acts as a holding mechanism, as is explained in more detail below.

The circumferential span of the toothing portions and the circumferential span of the annular step 30 can be obtained from the actual application.

Along its circumference as a continuation of the toothed area the driven wheel 20 has an arresting projection 40 in the form of an arresting flange protruding radially outwards. The arresting projection 40 has a concavely curved face 42, which faces the drive wheel 10 when the driven wheel 20 is rotated into the transitional position described above. In the transitional position (FIG. 1b) the arresting flange of the driven wheel 20 bears on the circumferential face 32 of the annular step 30, the radius of curvature of the concave bearing face 42 of the arresting projection 40 being equal to the radius of curvature of the convex circumferential face of the annular step 30. If the drive wheel 10 now rotates further clockwise, the last tooth 16 of the drive wheel 10 slides out of the driven wheel toothing 22, and the arresting position is reached, which is shown in FIG. 1C.

In the arresting position the annular step 30 of the drive wheel 10 slides along the concave face 42 of the arresting projection 40 and in the last tooth gap of the driven wheel toothing 22 in a circumferential direction U. The drive wheel 10 is thereby able to exert an alternating rotation for an adjustment function, whilst the driven wheel 20 is arrested in the arresting position.

The driven wheel 20 is prevented from turning back out of the arresting position into the starting position when the annular step 30 bears against the tooth flank 25 of the penultimate tooth 24 of the driven wheel toothing 22. The last tooth 26 of the driven wheel toothing 22, on the other hand, is narrower in an axial direction than the penultimate tooth 24, so that in the arresting position the annular step 30 can be received in the void behind the last tooth 26. The bottom of a concave trough, in which the annular step 30 engages in the arresting position, is therefore situated behind the last tooth 26. The last tooth 26 of the driven wheel toothing 22 here lies next to the starting portion of the arresting flange in an axial direction.

Figure 1B:
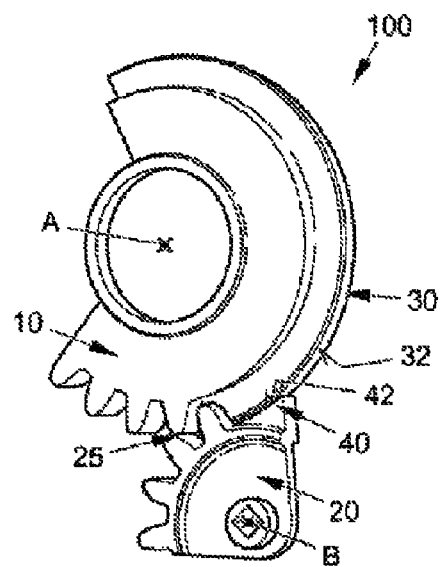
Figure 1C:
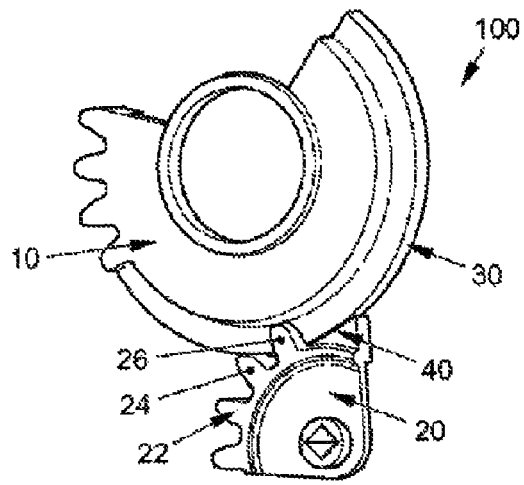

If the drive wheel 10 rotates counter-clockwise out of the adjustment range and again reaches the transitional position represented in FIG. 1b, the toothing is re-established and the driven wheel 20 can be turned back into the starting position in FIG. 1a.

The sequential engagement described can thereby be achieved with parallel axes of rotation by just one transmission step without additional components.

Figure 2B:
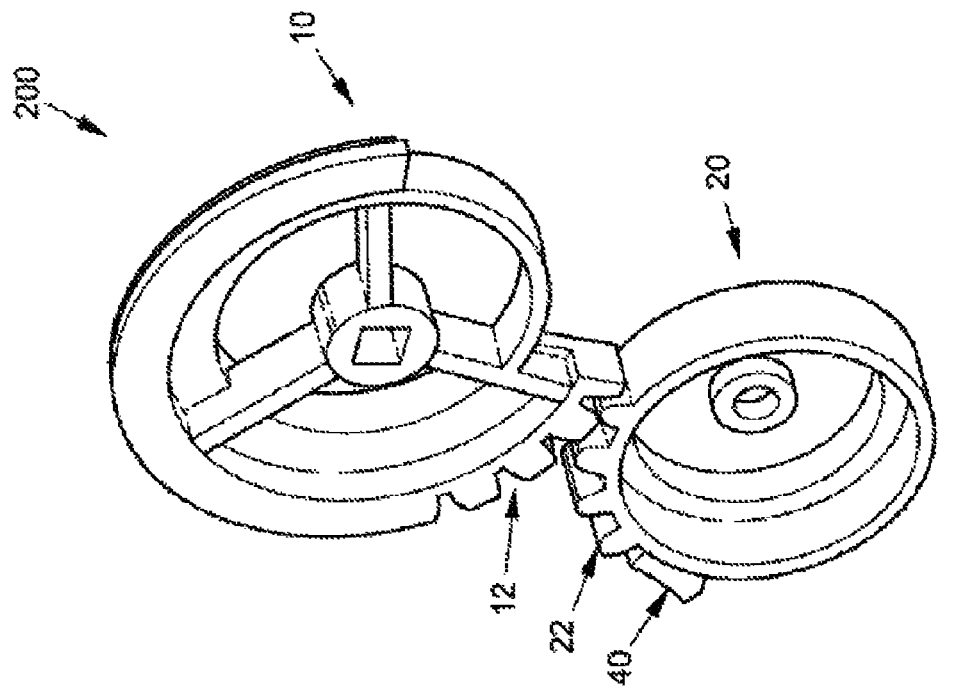
FIG. 2 shows a second embodiment of an adjustment system according to the invention obliquely from the front (FIG. 2a) and obliquely from the rear (FIG. 2b), each with the driven wheel in the first rotational position.
Figure 2A:
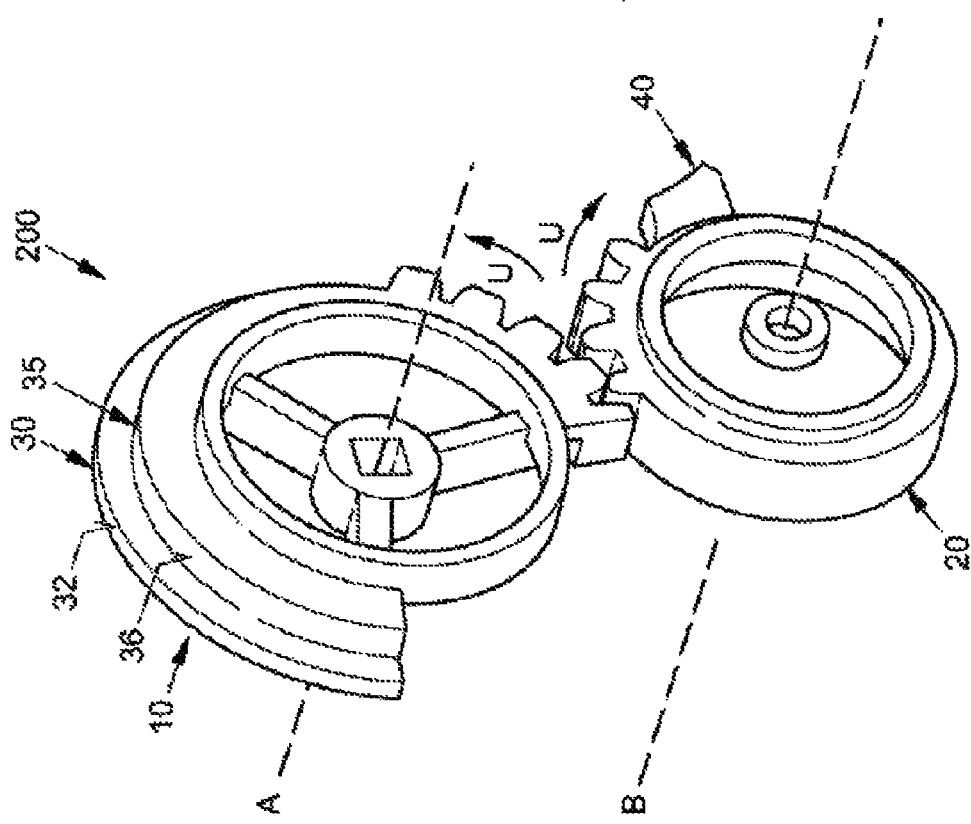
Figure 3B:
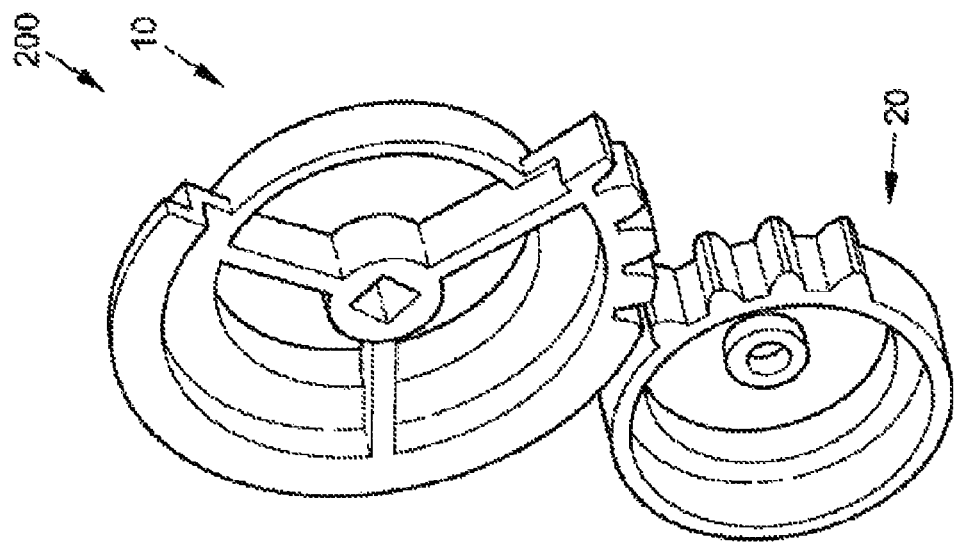
FIG. 3 shows the second embodiment of the adjustment system according to the invention obliquely from the front (FIG. 3a) and obliquely from the rear (FIG. 3b), each with the driven wheel in the transitional position.
Figure 3A:
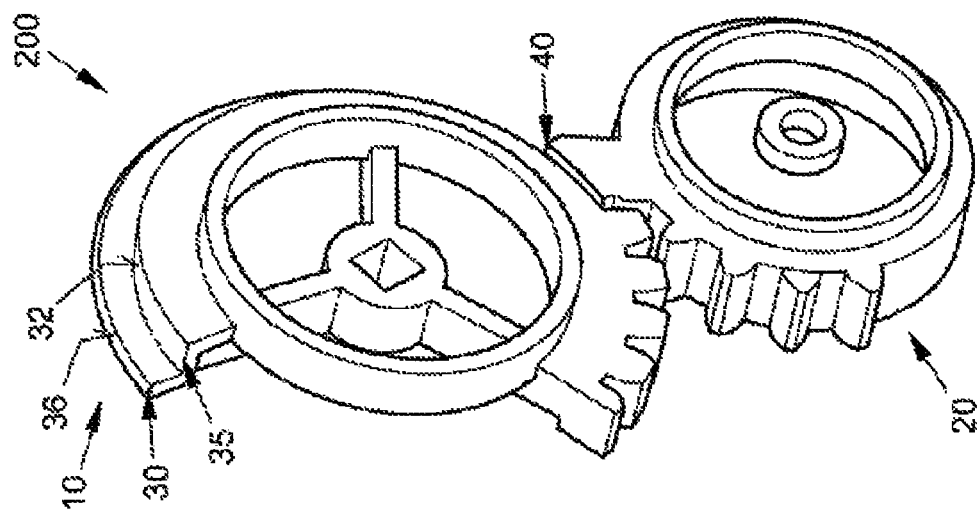
Figure 4B:
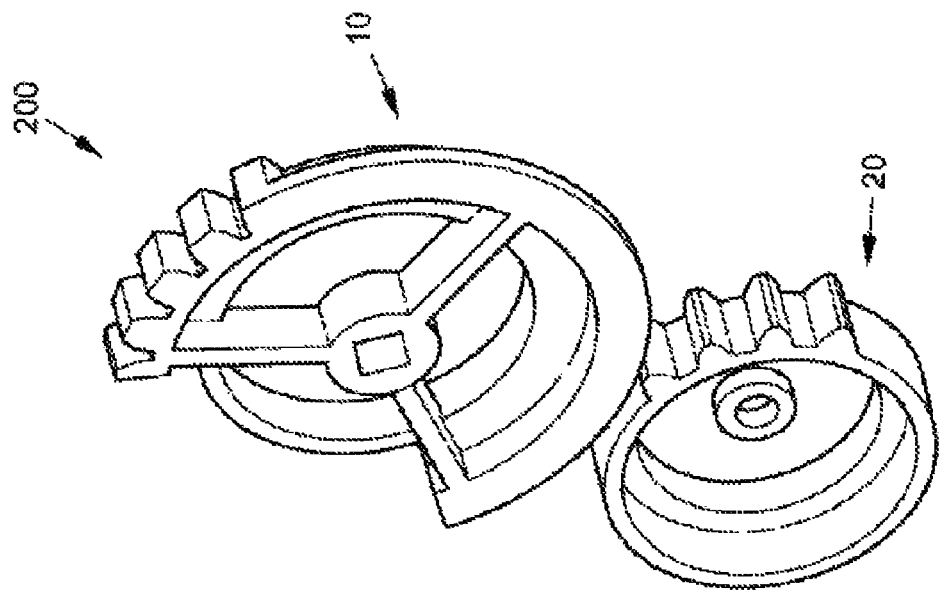
FIG. 4 shows the second embodiment of the adjustment system according to the invention obliquely from the front (FIG. 4a) and obliquely from the rear (FIG. 4b), each with the driven wheel in the arresting position.
Figure 4A:
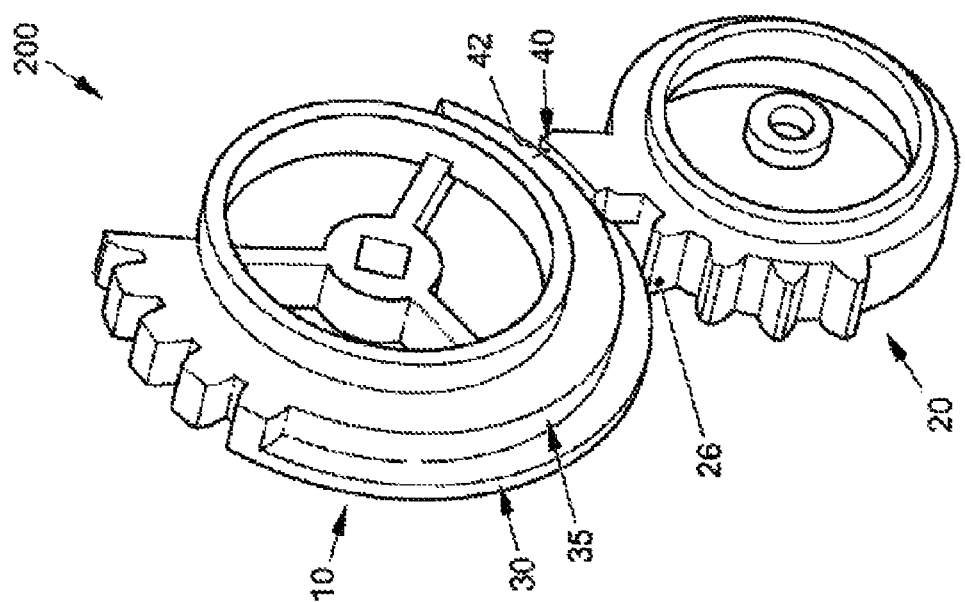
Figure 5A:
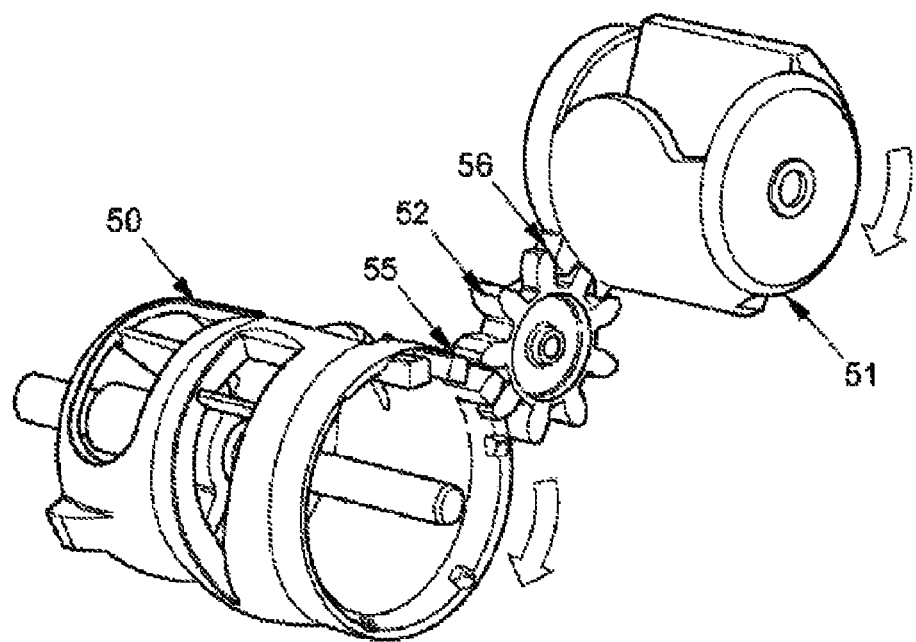
FIG. 5 shows an adjustment system disclosed by the state of the art.
Figure 5B:
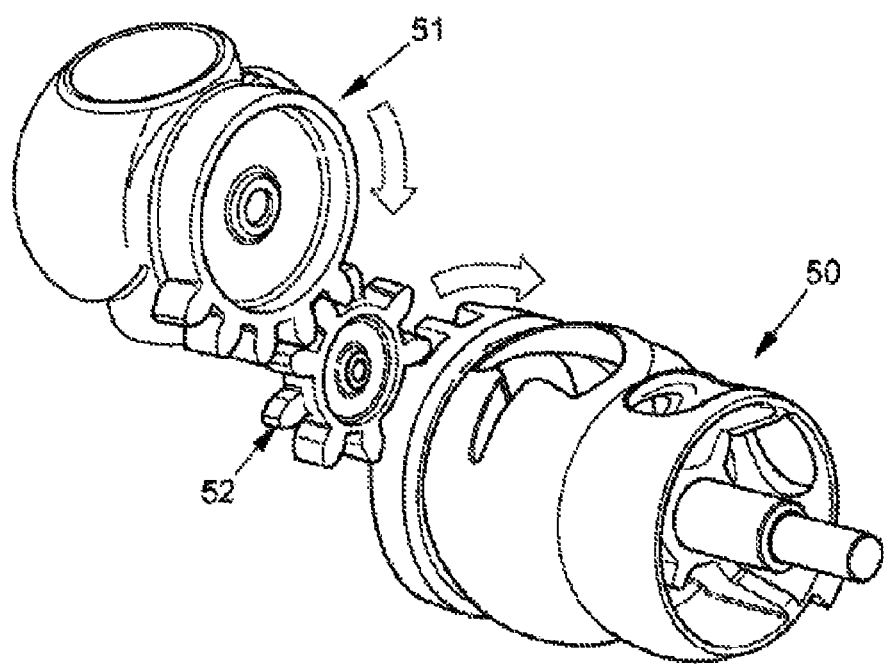

FIGS. 2 to 4 represent an alternative embodiment of the invention, which substantially corresponds to the adjustment system 100 explained above, so that the same reference numerals are used. FIG. 2 represents the first rotational position of the driven wheel 20 explained above, FIG. 3 represents the transitional position and FIG. 4 the arresting position.

Besides the first annular step 30, the adjustment system 200 according to the second embodiment (like the first embodiment) comprises a second annular step 35 having a smaller outside diameter than the first annular step 30. The circumferential face 36 of the second annular step 35 is arranged axially and radially offset next to the circumferential face 32 of the first annular step 30, its diameter substantially corresponding to the root diameter of the driven wheel toothing 12.

In contrast to the adjustment system 100, in the adjustment system 200 the arresting projection 40, which adjoins the driven wheel toothing 22 in the circumferential direction U, protrudes further radially than the driven wheel toothing 22, so that in the transitional position (FIG. 3) it comes to bear against the circumferential face 36 of the second annular step 35. In the arresting position represented in FIG. 4 the concavely curved outer face 42 of the arresting projection 40 bears closely against the convexly curved circumferential face 36 of the second radial step 35, so that a further counter-clockwise rotation of the driven wheel 20 is prevented when the circumferential face 36 of the second annular step 35 slides along the concave face 42 of the arresting projection 40 under a further clockwise rotation of the drive wheel 10. The radius of curvature of the concave face 42 of the arresting projection 40 here corresponds substantially to the radius of curvature of the circumferential face 36 of the second annular step 30.

At the same time in the arresting position the tooth flank of the last tooth 26 of the driven wheel toothing 22 bears on the first annular step 30. Due to the interaction of the two annular steps 30, 35 on the one hand, and the last tooth 26 together with the arresting projection 40, which together form a substantially concave trough, on the other, the driven wheel 20 is held in the arresting position when the drive wheel 10 rotates in the adjustment range. The driven wheel 20 is turned back into the starting position (FIG. 2) by the drive wheel 10 first being turned counter-clockwise until the transitional position shown in FIG. 3 is reached and the toothing systems 12, 22 again intermesh. From this point onwards the driven wheel 20 leaves the holding position and is carried by the drive wheel 10 into the starting position.

LIST OF REFERENCE NUMERALS 10 drive wheel
12 drive wheel toothing
16 last tooth of the drive wheel toothing
20 driven wheel
22 driven wheel toothing
24 tooth of the drive wheel toothing
25 tooth flank
26 last tooth of the driven wheel toothing
30 (first) annular step
32 circumferential face of the (first) annular step
35 second annular step
36 circumferential face of the second annular step
40 arresting projection
42 face of the arresting projection
50 driving gear
51 driven gear
52 intermediate gearwheel
55, 56 toothing systems
100 adjustment system
200 adjustment system
A axis of rotation of the drive wheel
B axis of rotation of the driven wheel
U circumferential direction
$\alpha$ circumferential angular span of the drive wheel toothing
$\beta$ circumferential angular span of the driven wheel toothing

The invention claimed is:
1. An adjustment system for a rotary valve, comprising:
a drive wheel rotatably mounted about a first axis of rotation and integrally formed with a first rotary valve device, said drive wheel having a drive wheel toothing formed over only a defined partial angular span in a circumferential direction;

a driven wheel to be driven by said drive wheel about a second axis of rotation substantially parallel to said first axis of rotation, said driven wheel being integrally formed with a second rotary valve device and having a driven wheel toothing formed over only a defined partial angular span in a circumferential direction;

said drive wheel being configured for rotation to adjust said driven wheel from a first rotational position, in which said drive wheel toothing and said driven wheel toothing intermesh directly and without an interposition of a transmission, into an arresting position, in which said driven wheel is held when said drive wheel rotates further;

wherein said driven wheel is formed with an arresting projection adjoining said driven wheel toothing in a circumferential direction and which takes the form of an arresting flange projecting radially outwards, which in the arresting position prevents further rotation of the driven wheel by bearing on said drive wheel; and wherein said arresting projection has a concavely curved outer face with a radius of curvature substantially corresponding to a radius of curvature of a peripheral face of said drive wheel.

2. The adjustment system according to claim 1, wherein said drive wheel toothing and/or said driven wheel toothing extend over a circumferential angular span of between 10° and 180°.

3. The adjustment system according to claim 2, wherein said drive wheel toothing and/or said driven wheel toothing extend over a circumferential angular span of between 30° and 90°.

4. The adjustment system according to claim 2, wherein said drive wheel toothing and/or said driven wheel toothing extend over a circumferential angular span of between 50° and 70°.

5. The adjustment system according to claim 1, wherein said drive wheel is formed with an annular step adjoining said drive wheel toothing in a circumferential direction, said annular step having a convexly curved peripheral face with a diameter greater than a root diameter of said drive wheel toothing.

6. The adjustment system according to claim 5, wherein the annular step extends over a circumferential angle of between 60 and 270.

7. The adjustment system according to claim 6, wherein the annular step extends over a circumferential angle of between 120 and 220.

8. The adjustment system according to claim 5, wherein, in the arresting position, said peripheral face of said annular step is configured to bear against one of the teeth of said driven wheel toothing in order to prevent said driven wheel from turning back towards the first rotational position.

9. The adjustment system according to claim 8, wherein, in the arresting position, said peripheral face of said annular step is configured to bear against a tooth flank of a penultimate tooth or a last tooth of said driven wheel in a circumferential direction.

10. The adjustment system according to claim 5, wherein at least one tooth of said driven wheel toothing is formed narrower in an axial direction than a tooth adjacent thereto, forming a void in which to receive said annular step in the arresting position.

11. The adjustment system according to claim 5, wherein said at least one tooth is a last tooth of said driven wheel toothing in a circumferential direction.

12. The adjustment system according to claim 5, wherein, in the arresting position, said a peripheral face of said annular step bears firstly against said arresting projection of said driven wheel, thereby preventing a further rotation of the driven wheel, and secondly against a tooth flank of a tooth of said driven wheel toothing, thereby preventing the driven wheel from turning back.

13. A rotary valve arrangement, comprising: an adjustment system according to claim 1, and wherein said drive wheel is connected to a first cross sectional adjustment element and said driven wheel is connected to a second cross sectional adjustment element.

14. The rotary valve arrangement according to claim 13, configured for a coolant circuit of an internal combustion engine with multiple branches.

15. An adjustment system for a rotary valve, comprising:
a drive wheel rotatably mounted about a first axis of rotation and integrally formed with a first rotary valve device, said drive wheel having a drive wheel toothing formed over only a defined partial angular span in a circumferential direction;
a driven wheel to be driven by said drive wheel about a second axis of rotation substantially parallel to said first axis of rotation, said driven wheel being integrally formed with a second rotary valve device and having a driven wheel toothing formed over only a defined partial angular span in a circumferential direction;
said drive wheel being configured for rotation to adjust said driven wheel from a first rotational position, in which said drive wheel toothing and said driven wheel toothing intermesh directly and without an interposition of a transmission, into an arresting position, in which said driven wheel is held when said drive wheel rotates further;
said drive wheel being formed with an annular step adjoining said drive wheel toothing in a circumferential direction, said annular step having a convexly curved peripheral face with a diameter greater than a root diameter of said drive wheel toothing, and an outside diameter of said annular step substantially corresponding to a tip diameter of said drive wheel toothing.

16. An adjustment system for a rotary valve, comprising:
a drive wheel rotatably mounted about a first axis of rotation and integrally formed with a first rotary valve device, said drive wheel having a drive wheel toothing formed over only a defined partial angular span in a circumferential direction;
a driven wheel to be driven by said drive wheel about a second axis of rotation substantially parallel to said first axis of rotation, said driven wheel being integrally formed with a second rotary valve device and having a driven wheel toothing formed over only a defined partial angular span in a circumferential direction;
said drive wheel being configured for rotation to adjust said driven wheel from a first rotational position, in which said drive wheel toothing and said driven wheel toothing intermesh directly and without an interposition of a transmission, into an arresting position, in which said driven wheel is held when said drive wheel rotates further;
said drive wheel being formed with a first annular step adjoining said drive wheel toothing in a circumferential direction, said first annular step having a convexly curved peripheral face with a diameter greater than a root diameter of said drive wheel toothing, and said drive wheel being formed with a second annular step having a circularly curved circumferential face, designed to bear against said arresting projection adjoining said driven wheel toothing in a circumferential direction.

17. The adjustment system according to claim 16, wherein a diameter of said second annular step is smaller than a diameter of said first annular step, and said arresting projection protrudes farther from said driven wheel in a radial direction than said driven wheel toothing.

\* \* \* \* \*